United States Patent
Maruo et al.

(10) Patent No.: US 12,218,383 B2
(45) Date of Patent: Feb. 4, 2025

(54) ELECTRODE PLATE FOR NON-AQUEOUS ELECTROLYTE SECONDARY BATTERY, AND NON-AQUEOUS ELECTROLYTE SECONDARY BATTERY

(71) Applicant: Panasonic Intellectual Property Management Co., Ltd., Osaka (JP)

(72) Inventors: Takanori Maruo, Osaka (JP); Shinji Mino, Osaka (JP); Motoki Kinugawa, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 1033 days.

(21) Appl. No.: 17/041,693

(22) PCT Filed: Feb. 28, 2019

(86) PCT No.: PCT/JP2019/007741
§ 371 (c)(1),
(2) Date: Sep. 25, 2020

(87) PCT Pub. No.: WO2019/193882
PCT Pub. Date: Oct. 10, 2019

(65) Prior Publication Data
US 2021/0013482 A1   Jan. 14, 2021

(30) Foreign Application Priority Data
Apr. 6, 2018   (JP) .................................. 2018-074113

(51) Int. Cl.
*H01M 50/538* (2021.01)
*H01M 4/13* (2010.01)
(Continued)

(52) U.S. Cl.
CPC .......... *H01M 50/538* (2021.01); *H01M 4/13* (2013.01); *H01M 4/625* (2013.01);
(Continued)

(58) Field of Classification Search
None
See application file for complete search history.

(56) References Cited

U.S. PATENT DOCUMENTS

| 6,261,722 B1* | 7/2001 | Dasgupta | H01M 4/62 |
| | | | 429/231.95 |
| 2014/0287304 A1* | 9/2014 | Netz | H01M 4/13 |
| | | | 156/60 |

(Continued)

FOREIGN PATENT DOCUMENTS

| JP | 2003068271 A  * | 3/2003 |
| JP | 2008-234855 A | 10/2008 |

(Continued)

OTHER PUBLICATIONS

International Search Report dated May 21, 2019, issued in counterpart Application No. PCT/JP2019/007741. (2 pages).

(Continued)

*Primary Examiner* — Robert S Carrico
(74) *Attorney, Agent, or Firm* — WHDA, LLP

(57) ABSTRACT

This electrode plate for a non-aqueous electrolyte secondary battery has a band-like core and a first active substance layer formed on at least a first surface of the core. A current-collecting lead is connected to an exposed section at which a portion of the first surface of the core is exposed in the longitudinal direction. The electrode plate for a non-aqueous electrolyte secondary battery has a second active substance layer which is more electroconductive than the first active substance layer and which is disposed on a portion of the first surface such that it adjoins with the exposed section.

19 Claims, 6 Drawing Sheets

(51) Int. Cl.
  *H01M 4/62* (2006.01)
  *H01M 10/0525* (2010.01)
  *H01M 10/0587* (2010.01)
  *H01M 50/534* (2021.01)
  *H01M 50/536* (2021.01)

(52) U.S. Cl.
  CPC .... *H01M 10/0587* (2013.01); *H01M 10/0525* (2013.01); *H01M 50/534* (2021.01); *H01M 50/536* (2021.01)

(56) References Cited

U.S. PATENT DOCUMENTS

| 2017/0162866 A1 | 6/2017 | Saka et al. |
| 2018/0342726 A1 | 11/2018 | Takahashi et al. |
| 2019/0054495 A1 | 2/2019 | Tsukamoto et al. |

FOREIGN PATENT DOCUMENTS

| JP | 2009-211956 A | | 9/2009 |
| JP | 2016-018731 A | | 2/2016 |
| JP | 2016-58247 A | | 4/2016 |
| JP | 2016058247 A | * | 4/2016 |
| WO | 2016/006154 A1 | | 1/2016 |
| WO | 2017/077696 A1 | | 5/2017 |
| WO | 2017/149977 A1 | | 9/2017 |

OTHER PUBLICATIONS

Uehara K., "Fabrication and Characterization of Lithium-ion Battery Electrode Base Powder", The Micromeritics, 2013, No. 56, pp. 18-23, with partial English translation, cited in JP Office Action dated Jul. 25, 2023. (8 pages).

* cited by examiner

ELECTRODE PLATE FOR NON-AQUEOUS ELECTROLYTE SECONDARY BATTERY, AND NON-AQUEOUS ELECTROLYTE SECONDARY BATTERY

TECHNICAL FIELD

The present disclosure relates to an electrode plate for a non-aqueous electrolyte secondary battery, and to a non-aqueous electrolyte secondary battery.

BACKGROUND

A non-aqueous electrolyte secondary battery having a circular tube shape has a rolled type electrode element in which a cathode plate and an anode plate which are electrode plates are rolled in a spiral shape with a separator therebetween, and is formed by housing the electrode element in an exterior housing body. Electricity collecting leads are connected to the cathode plate and the anode plate of the electrode element, and each of the cathode plate and the anode plate is connected to a sealing element, an exterior housing can, or the like via the electricity collecting leads.

Patent Literature 1 discloses that, in forming a cathode plate formed in a band shape, a combined material in which a cathode active substance, an electrically conductive material, a bonding material, or the like are mixed and are made into a paste form is ejected and applied from first and second application nozzles to an electricity collecting element (core). In this process, the electricity collecting element is continuously moved in a long-length direction, and each application nozzle has ejection ports distanced from each other in a width direction of the electricity collecting element. Each application nozzle is configured to allow control of simultaneous opening/closing of the ejection ports. When the ejection port of the application nozzle is closed, a plain portion (a core exposed portion) is formed in which the combined material is not applied to the electricity collecting element.

CITATION LIST

Patent Literature

Patent Literature 1: WO 2017/077696

SUMMARY

When the electricity collecting leads are connected to the cathode plate and the anode plate as described above, because a connection area between the electrode plate and the electricity collecting lead is small, an electricity collecting efficiency may become low and an internal resistance of the battery may consequently become high. In the structure disclosed in Patent Literature 1, the two application nozzles do not eject different combined materials, and thus, there is still room for improvement from the viewpoint of reduction of the internal resistance of the battery which uses the obtained electrode plates. In this regard, a configuration may be considered in which an electrical conductivity of the entirety of the combined material applied to the electrode plate is uniformly increased, to reduce the internal resistance of the battery. However, in this case, the efficiency of a battery reaction by the electrode plates may be degraded, which may result in an excessive reduction in battery capacity.

An advantage of the present disclosure lies in reduction of the internal resistance of the battery without an excessive reduction of the battery capacity in an electrode plate for a non-aqueous electrolyte secondary battery and in a non-aqueous electrolyte secondary battery.

According to one aspect of the present disclosure, there is provided an electrode plate for a non-aqueous electrolyte secondary battery including: a core having a band shape; a first active substance layer formed over at least a first surface of the core, wherein an electricity collecting lead is connected to an exposed portion in which the core is exposed at a portion of the first surface in a long-length direction; and a second active substance layer that is disposed over a portion of the first surface, adjacent to the exposed portion, and that has a higher electrical conductivity than the first active substance layer.

According to another aspect of the present disclosure, there is provided a non-aqueous electrolyte secondary battery including: an electrode element in which at least one cathode plate and at least one anode plate are rolled with a separator therebetween; and an exterior housing can that houses the electrode element, wherein at least one of the cathode plate or the anode plate is the electrode plate for a non-aqueous electrolyte secondary battery according to the present disclosure.

According to the electrode plate for the non-aqueous electrolyte secondary battery, and the non-aqueous electrolyte secondary battery of the present disclosure, the internal resistance of the battery can be reduced without excessively reducing the battery capacity.

DESCRIPTION OF EMBODIMENTS

An embodiment of the present disclosure will now be described in detail with reference to the attached drawings.

In the following description, a specific shape, a specific material, a specific numerical value, a specific direction, and the like are merely exemplary for facilitating understanding of the present disclosure, and may be suitably changed according to a specification of an electrode plate for a non-aqueous electrolyte secondary battery or of a non-aqueous electrolyte secondary battery. In addition, in the following description, a description of "approximate" is used to mean, for example, a case in which the members can be considered to be substantially the same, in addition to a case of exactly the same. Further, in the following description, if a plurality of embodiments or alternative configurations are described, suitable combinations of the characteristic portions thereof are also contemplated.

Figure 1:
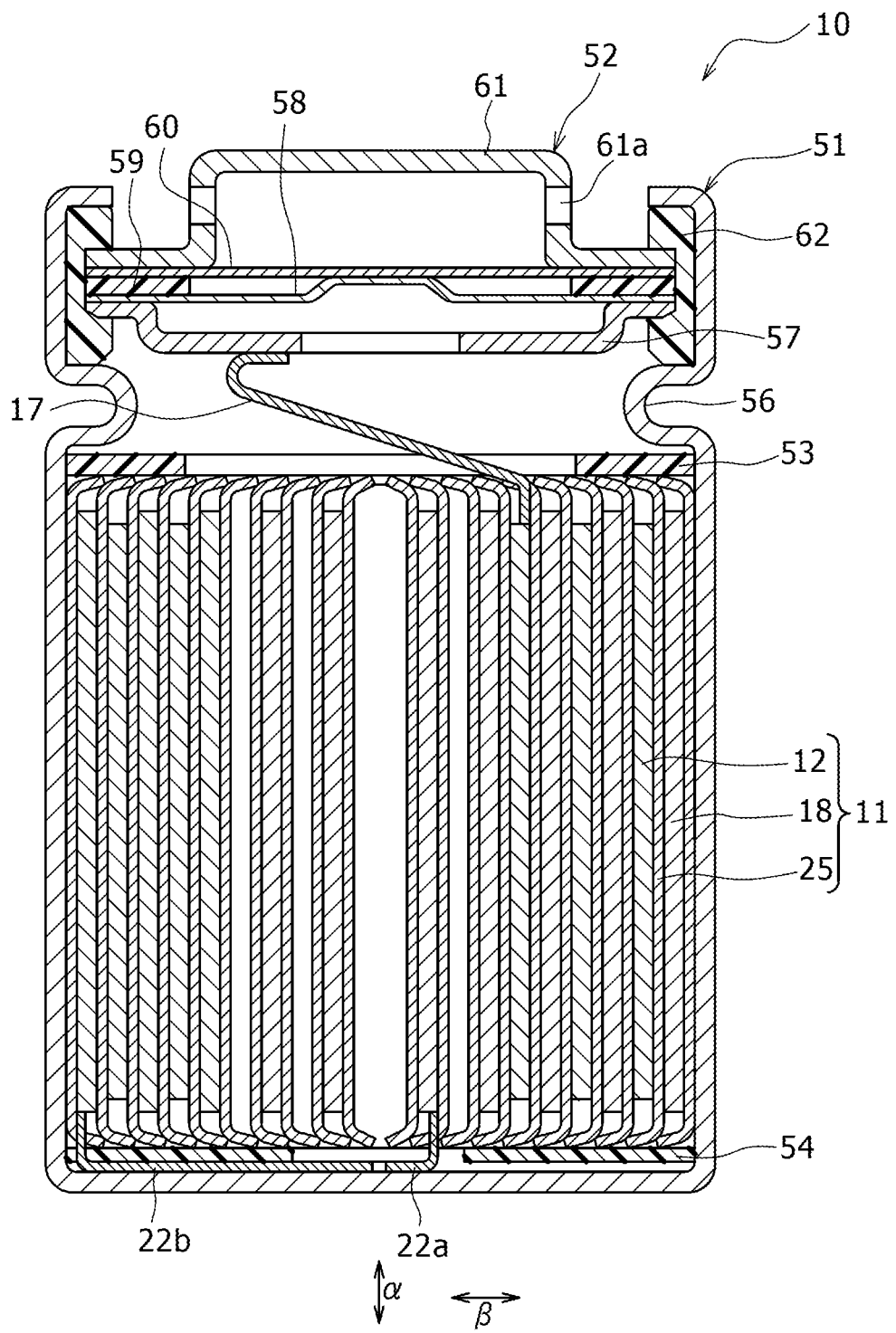
FIG. 1 is a cross-sectional diagram of a non-aqueous electrolyte secondary battery of an example configuration of an embodiment of the present disclosure.
Figure 2:
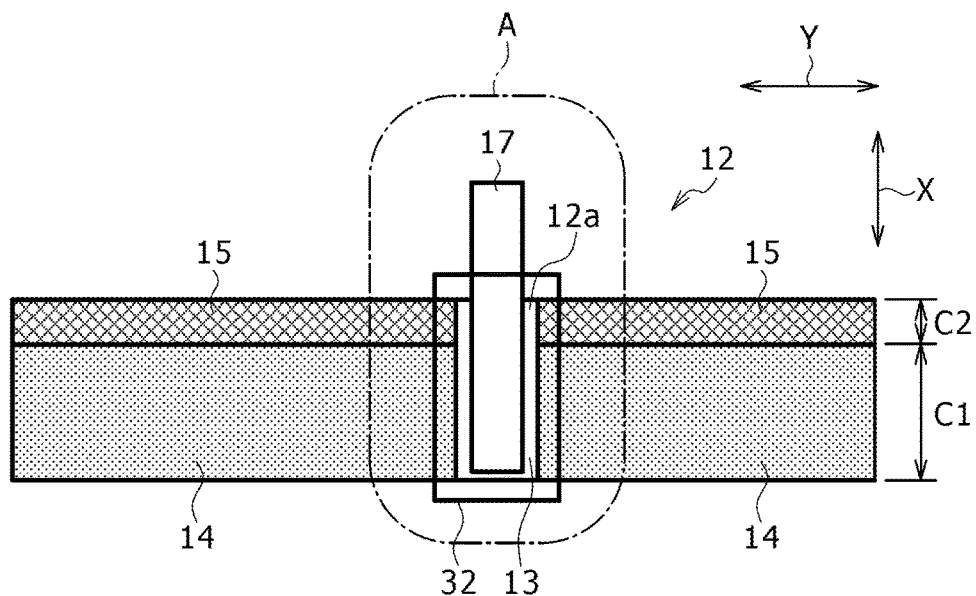
FIG. 2 is a diagram showing a cathode plate which is an electrode plate for the non-aqueous electrolyte secondary battery according to an embodiment of the present invention shown in FIG. 1, shown in an interior view.
Figure 3:
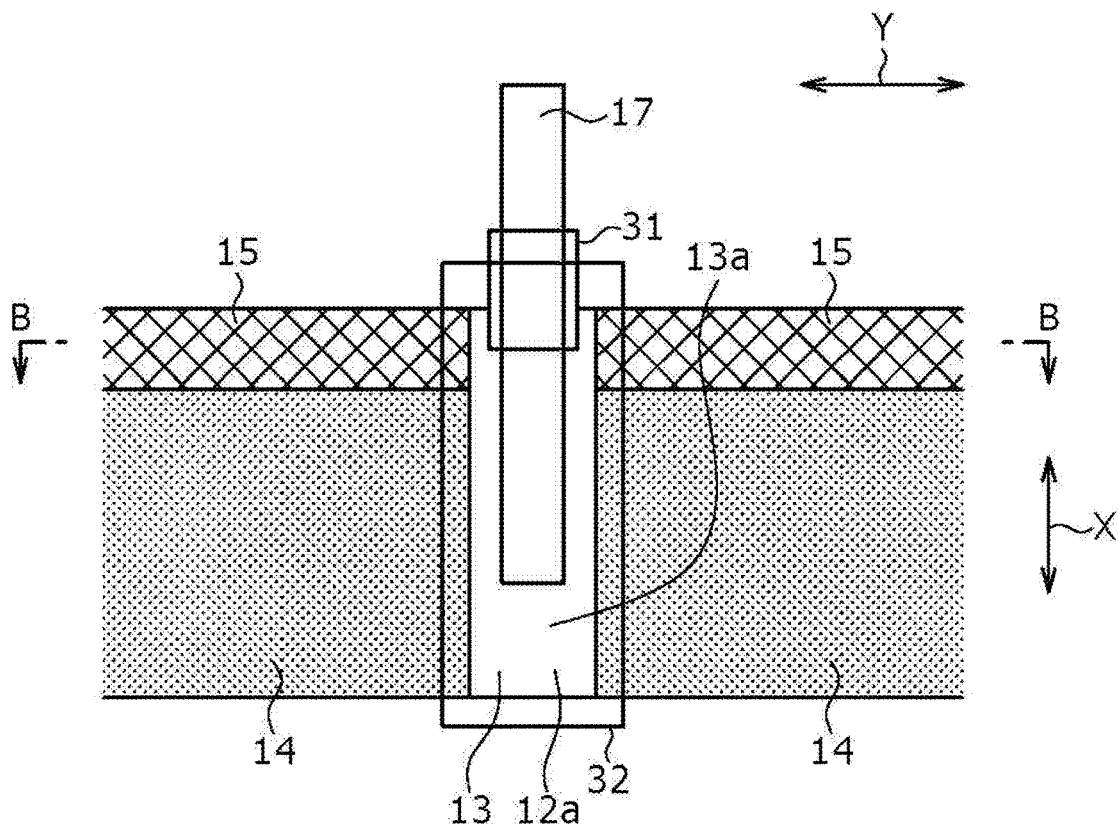
FIG. 3 is an enlarged diagram of an A part of FIG. 2.
Figure 4:
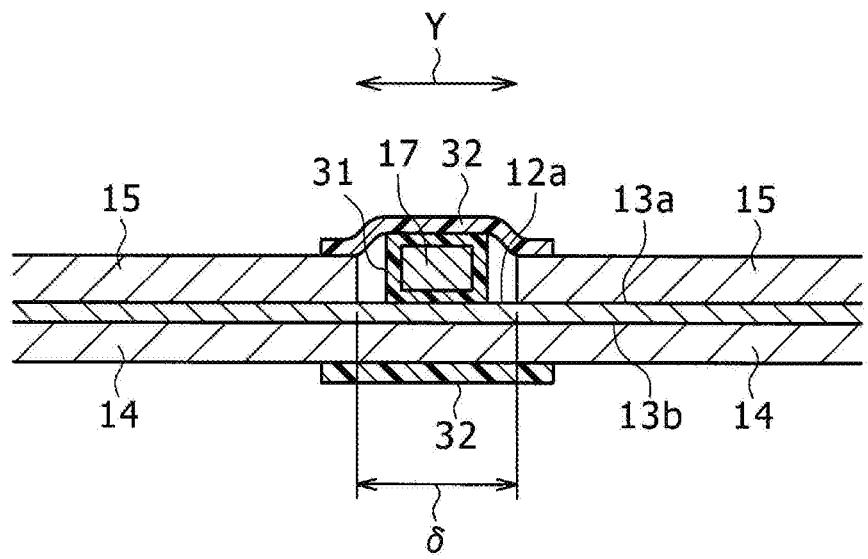
FIG. 4 is a cross-sectional diagram along a B-B line of FIG. 3.

FIG. 1 is a cross-sectional diagram of a non-aqueous electrolyte secondary battery 10 according to an embodiment of the present disclosure. FIG. 2 is a diagram showing a cathode plate 12 which is an electrode plate for a non-aqueous electrolyte secondary battery of the present embodiment shown in FIG. 1, in an interior view. FIG. 3 is an enlarged diagram of an A part of FIG. 2. FIG. 4 is a cross-sectional diagram along a B-B line of FIG. 3. In the following description, the non-aqueous electrolyte secondary battery may also be simply referred to as a "battery".

As exemplified in FIG. 1, the battery 10 includes a power generation element including a rolled type electrode element 11 and a non-aqueous electrolyte (not shown), and an exterior housing can 51. The rolled type electrode element 11 includes at least one cathode plate 12, at least one anode plate 18, and a separator 25, and the cathode plate 12 and the anode plate 18 are rolled in a spiral shape with the separator 25 therebetween. The cathode plate 12 and the anode plate 18 correspond to electrode plates. Further, the cathode plate 12 corresponds to a first electrode plate, and the anode plate 18 corresponds to a second electrode plate. In the following, one side in an axial direction of the electrode element 11 may be referred to as an "upper side" and the other side in the axial direction may be referred to as a "lower side". The non-aqueous electrolyte includes a non-aqueous solvent, and an electrolyte salt dissolved in the no-aqueous solvent. The non-aqueous electrolyte is not limited to liquid electrolyte, and may alternatively be a solid electrolyte which uses a gel-form polymer or the like.

The cathode plate 12 has a cathode core 13 (FIGS. 2 to 4) having a band shape, and a cathode lead 17 connected to the cathode core 13 by being joined therewith. The cathode lead 17 is an electrically conductive member for electrically connecting the cathode core 13 and a cathode terminal, and extends from an upper end of an electrode group structure toward one side (upper side) of an axial direction α of the electrode element 11. Here, the electrode group structure refers to portions of the electrode element 11 other than the leads. The cathode lead 17 is provided, for example, at an approximately center part in a radial direction β of the electrode element 11. In FIGS. 2 to 4, a short-length direction of the cathode plate 12 and the cathode core 13 is shown with an X and a long-length direction is shown with a Y.

The anode plate 18 includes an anode core having a band shape, and two anode leads 22a and 22b connected to the anode core. The anode leads 22a and 22b are electrically conductive members for electrically connecting the anode core and anode terminals, and extend from a lower end of the electrode group structure toward the other side (lower side) in the axial direction α of the electrode element 11. For example, one anode lead 22a, of the two anode leads 22a and 22b, is provided at an end on a roll-start side of the electrode element 11, and the other anode lead 22b is provided at an end on a roll-completion side of the electrode element 11.

The cathode lead 17 and the anode leads 22a and 22b correspond to electricity collecting leads. The cathode lead 17 and the anode leads 22a and 22b are electrically conductive members having a band shape, with a larger thickness than the corresponding cores. The thickness of each lead is, for example, three to thirty times the thickness of the core, and is typically 50 µm to 500 µm. No particular limitation is imposed on a constituting material of the lead. Desirably, the cathode lead 17 is formed from a metal having aluminum as a primary component, and the anode leads 22a and 22b are formed from a metal having nickel or copper as a primary component or a metal including both nickel and copper. Alternatively, of the anode leads 22a and 22b, one anode lead may be omitted.

In the example configuration shown in FIG. 1, a metal battery casing for housing the electrode element 11 and the non-aqueous electrolyte is formed by the exterior housing can 51 and a sealing element 52. Insulating plates 53 and 54 are respectively provided above and below the electrode element 11. The cathode lead 17 extends through a through hole in the insulating plate 53 at the upper side toward the side of the sealing element 52, and is welded on a lower surface of a filter 57 which is a bottom plate of the sealing element 52. In the battery 10, a cap 61 which is a top plate of the sealing element 52 electrically connected to the filter 57 serves as the cathode terminal. On the other hand, the anode lead 22a extends through a through hole in the insulating plate 54 at the lower side toward the bottom side of the exterior housing can 51, and the anode lead 22b extends through an outer side of the insulating plate 54 at the lower side toward the bottom side of the exterior housing can 51. The anode leads are welded to an inner surface at the bottom of the exterior housing can 51. In the battery 10, the exterior housing can 51 serves as the anode terminal.

As described above, the electrode element 11 has a rolled structure in which the cathode plate 12 and the anode plate 18 are rolled in the spiral shape with the separator 25 therebetween. The cathode plate 12, the anode plate 18, and the separator 25 are formed in the band shape, and are rolled in the spiral shape, to result in a state in which these elements are alternately layered in the radial direction β of the electrode element 11. In the electrode element 11, the long-length direction Y of each electrode plate (FIG. 2) is a direction of rolling, and a short-length direction X of each electrode plate (FIG. 2) is the axial direction α.

The exterior housing can is a metal container having a circular tube shape with a bottom. A gasket 62 is provided between the exterior housing can 51 and the sealing element 52, so as to secure airtightness in the battery casing. The exterior housing can 51 has a protruding portion 56 which is formed by, for example, pressing a side surface portion from the outside, and which supports the sealing element 52. The protruding portion 56 is desirably formed in an annular shape along a circumferential direction of the exterior housing can 51, and supports the sealing element 52 with an upper surface thereof. The sealing element 52 closes an opening of the exterior housing can 51.

The sealing element 52 has the filter 57, a lower valve element 58, an insulating member 59, an upper valve element 60, and the cap 61, which are layered in this order from the side of the electrode element 11. Each member of the sealing element 52 has, for example, a circular disk shape or a ring shape, and are electrically connected to each other, except for the insulating member 59. The lower valve element 58 and the upper valve element 60 are connected to each other at the center parts thereof, and the insulating member 59 is provided between peripheral portions of the valve elements. When an internal pressure of the battery is increased due to abnormal heat generation, for example, the lower valve element 58 is ruptured, and the upper valve element 60 is consequently expanded toward the side of the cap 61 and is separated from the lower valve element 58, to thereby cut the electrical connection between the valve elements. When the internal pressure is further increased, the upper valve element 60 is ruptured, and gas is discharged from an opening 61a of the cap 61.

Next, with reference to FIGS. 2 to 4, the cathode plate 12 will be described in detail. The cathode plate 12 includes the cathode core 13 having the band shape, a first active substance layer 14 which is a first cathode active substance layer formed over the cathode core 13, and a second active substance layer 15 which is a second cathode active substance layer and which has a higher electrical conductivity than the first active substance layer 14. In FIGS. 2 and 3, the first active substance layer 14 is shown with a sand-like form and the second active substance layer 15 is shown with a slanted lattice form. In the present embodiment, the first active substance layer 14 is formed over both surfaces of the cathode core 13. For the cathode core 13, for example, a metal foil such as aluminum, or a film in which such a metal is disposed on a front layer, or the like is used. A desirable cathode core 13 is a metal foil having aluminum or an aluminum alloy as a primary component. A thickness of the cathode core 13 is, for example, 10 μm to 30 μm.

The first active substance layer 14 is formed over the entire region of a first surface 13a (FIG. 4) of the cathode core 13, which is a front-side surface on the page of FIG. 2, other than a core exposed portion 12a which will be described later, within a first range C1 in the short-length direction X. The first active substance layer 14 is formed also over all regions of a second surface 13b (FIG. 4) of the cathode core 13, which is a back-side surface on the page of FIG. 2. On the other hand, the second active substance layer 15 is formed over all regions of the first surface 13a of the cathode core 13 other than the core exposed portion 12a which will be described later within a second range C2 in the short-length direction X different from that of the first active substance layer 14. The second active substance layer 15 is not formed over the second surface 13b (FIG. 4) of the cathode core 13. In addition, the second active substance layer 15 is disposed to be adjacent to the core exposed portion 12a which will be described later. With this configuration, the second active substance layer 15 is disposed only at a portion in the short-length direction X of the first surface of the cathode core 13, more specifically, only at an end on a side of extension of the cathode lead 17 (upper end of FIG. 2) in the short-length direction X. In addition, the second active substance layer 15 is formed along the long-length direction Y of the first surface of the cathode core 13. More specifically, the second active substance layer 15 is formed along the long-length direction Y over all regions other than the core exposed portion 12a in the long-length direction of the cathode core 13.

The first active substance layer 14 is optimally set for achieving superior reaction with the anode. The first active substance layer 14 includes a cathode active substance and a binding agent. The first active substance layer 14 may alternatively include an electrically conductive material.

Similar to the first active substance layer 14, the second active substance layer 15 includes the cathode active substance and the binding agent, and further includes an electrically conductive material. Further, the second active substance layer 15 has a higher electrical conductivity than the first active substance layer 14. For example, the second active substance layer 15 has a larger amount of the electrically conductive material per unit area than the first active substance layer 14. For example, when the amount of the electrically conductive material in the first active substance layer 14 is 1% or less, the amount of the electrically conductive material in the second active substance layer 15 is desirably the amount of the electrically conductive material in the first active substance layer 14 or greater, and 50% or less.

Alternatively, a configuration may be employed in which the amount of electrically conductive material per unit area in the second active substance layer 15 is not set greater than that in the first active substance layer 14, but rather, the electrically conductive material included in the second active substance layer 15 is in a fiber form and the electrically conductive material in the first active substance layer 14 is in a non-fiber, particle form. For example, the second active substance layer 15 may include a carbon nanotube as the electrically conductive material, and the first active substance layer 14 may include no carbon nanotube, and include non-fiber particles as the electrically conductive material, such as, for example, acetylene black (AB). According to this structure, the current flows more easily toward the cathode lead 17 through the second active substance layer 15. The use of the second active substance layer 15 including the fiber-form electrically conductive material may result in an increase in the cost, but, because only a part of the active substance layer on the side of the first surface 13a of the cathode plate 12 is set as the second active substance layer 15, the increase in the cost can be suppressed.

Alternatively, a configuration may be employed in which the second active substance layer 15 has a larger amount of the electrically conductive material per unit area than that of the first active substance layer 14, the electrically conductive material in the second active substance layer 15 is in the fiber form, and the electrically conductive material in the first active substance layer 14 is in the non-fiber, particle form.

Desirably, a ratio of a length of the second range C2 on the second active substance layer 15 with respect to an entire length of the cathode plate 12 in the short-length direction X is about 15%.

The cathode plate 12 is fabricated by applying a first cathode combined material slurry over both surfaces of the cathode core 13, applying a second cathode combined material slurry over the first surface 13a of the cathode core 13, and then drying and rolling the materials. Here, the first cathode combined material slurry includes a cathode active substance, a binding agent, and a solvent having N-methyl-2-pyrrolidone (NMP), or the like, and which may additionally have an electrically conductive material as necessary. The second cathode combined material slurry includes a cathode active substance, a binding agent, an electrically conductive material, and a solvent having N-methyl-2-pyrrolidone (NMP) or the like. When the first and second combined material slurries are applied over the first surface 13a of the cathode core 13, as will be described below, the combined material slurry may be ejected from ejection ports of a plurality of application nozzles as will be described below, and applied over the first surface 13a.

As the cathode active substance, lithium-containing transition metal oxides which contains a transition metal element such as Co, Mn, and Ni may be exemplified. No particular limitation is imposed on the lithium-containing transition metal oxide, but desirably, a composite oxide is employed which is represented by a general formula of $Li_{1+x}MO_2$ (wherein $-0.2<x\leq 0.2$, and M includes at least one of Ni, Co, Mn, and Al).

Examples of the electrically conductive material contained in the first active substance layer 14 include, in addition to the acetylene black (AB), carbon materials such as carbon black (CB), Ketjen black, graphite, or the like. Examples of the binding agent include fluoride-based resins such as polytetrafluoroethylene (PTFE), polyvinylidene fluoride (PVdF), polyacrylonitrile (PAN), polyimide (PI), an acryl-based resin, a polyolefin-based resin, and the like. Alternatively, these resins and carboxymethyl cellulose (CMC) or a salt thereof, polyethylene oxide (PEO), and the like may be used in combination. For these materials, one material may be used as a single entity or two or more materials may be used in combination.

On the first surface 13a of the cathode plate 12, the core exposed portion 12a (FIGS. 3 and 4) is provided in which a surface of the metal forming the cathode core 13 is exposed. The core exposed portion 12a is a portion to which the cathode lead 17 is connected, and in which the surface of the cathode core 13 is not covered by either the first active substance layer 14 or the second active substance layer 15. The core exposed portion 12a is formed in a wider width than the cathode lead 17. In the example configuration shown in FIG. 2, the core exposed portion 12a is provided at the center part in the long-length direction Y of the cathode plate 12 over an entire length in the short-length direction X of the cathode core 13. The core exposed portion 12a may be formed at a position near an end in the long-length direction Y of the cathode plate 12, but, from the viewpoint of the electricity collecting characteristic, the core exposed portion 12a is desirably provided at a position that is approximately an equal distance from the ends in the long-length direction Y. As a result of the cathode lead 17 being connected to the core exposed portion 12a provided at such a position, when the cathode plate is rolled as a part of the electrode element 11, the cathode lead 17 is disposed protruding upward from the end surface in the axial direction, at an intermediate position in the radial direction of the electrode element 11. The core exposed portion 12a is provided, for example, by an intermittent application in which the first and second cathode combined material slurries are not applied at a portion of the cathode core 13.

As shown in FIG. 4, on the second surface 13b of the cathode core 13, the first active substance layer 14 is disposed at a position opposite, in the thickness direction of the cathode core 13, to the core exposed portion 12a. Alternatively, a configuration may be employed in which, on the second surface 13b of the cathode core 13, the active substance layer is not disposed at a position opposite, in the thickness direction of the cathode core 13, to the core exposed portion 12a in which the cathode lead 17 is disposed. For example, a core exposed portion may be formed, on the second surface 13b, of the cathode plate 12, at an opposite side to the cathode lead 17, in the same width direction (left-and-right direction of FIG. 4) range (a range shown by an arrow δ in FIG. 4) as the width direction range of the core exposed portion 12a.

As shown in FIG. 3, the cathode lead 17 is joined with the core exposed portion 12a by, for example, laser welding, ultrasonic welding, or the like. In this configuration, a portion of the cathode lead 17 extending from the cathode core 13 and a portion of the cathode lead 17 connected to the cathode core 13 are covered by a first tape 31 (FIGS. 3 and 4) and a second tape 32.

The first tape 31 is adhered on the cathode lead 17 in a manner to be wound around the portion of the cathode lead 17 extending from the cathode core 13 and the portion of the cathode lead 17 overlapping the cathode core 13. Two second tapes 32 sandwich the cathode plate 12 from respective sides in the thickness direction, so as to cover a portion of the cathode lead 17 overlapping the core exposed portion 12a including the portion on which the first tape 31 is wound, and a portion of the first and second active substance layers 14 and 15. The two second tapes 32 are adhered to each other at portions extending from the ends in the short-length direction X of the cathode plate 12. With this configuration, the second tape 32 is adhered on the cathode plate 12 to cover the core exposed portion 12a. The first tape 31 and the second tape 32 are formed from insulating materials. The tapes 31 and 32 are made of, for example, a resin such as polypropylene (PP). With the first tape 31 and the second tape 32, it is possible to prevent internal short-circuiting in the event of tearing of the separator 25 between the cathode plate 12 and the anode plate 18. In FIG. 3, the first tape 31 and the second tape 32 are shown as transparent, but alternatively, the tapes may be semi-transparent or non-transparent.

In the cathode plate 12, the first and second active substance layers 14 and 15 are formed over the cathode core 13 in the following manner. For example, the cathode core 13 is moved along the long-length direction Y, and the first cathode combined material slurry and the second cathode combined material slurry are ejected from ejection ports of a plurality of application nozzles disposed separately in the first range C1 in the short-length direction X of the cathode core 13 and in the second range C2 in the short-length direction X, to apply the slurries in the ranges C1 and C2 of the cathode core 13. In this process, the plurality of application nozzles may eject the combined material slurries simultaneously at the same positions in the long-length direction Y of the cathode core 13, or alternatively, the combined material slurries may be ejected at positions distanced in the long-length direction Y of the cathode core 13, while the ejection starting time is changed.

Referring back to FIG. 1, the anode plate 18 includes an anode core having a band shape, and an anode active substance layer formed over the anode core. Desirably, an anode active substance layer 20 is formed over both surfaces of the anode core. For the anode core, for example, a metal foil such as copper, a film in which such a metal is disposed on a front surface thereof, or the like is used. A thickness of the anode core is, for example, 5 μm to 30 μm.

The anode active substance layer is desirably formed over both surfaces of the anode core, over all regions other than a core exposed portion of the anode plate 18. The anode active substance layer desirably includes an anode active substance and a binding agent. The anode plate is fabricated, for example, by applying an anode combined material slurry including the anode active substance, the binding agent, and water or the like over both surfaces of the anode core, and then drying and rolling the materials.

No particular limitation is imposed on the anode active substance so long as the substance can reversibly occlude and release lithium ions, and, for example, carbon materials such as natural graphite, synthetic graphite, or the like, a metal which forms an alloy with lithium such as Si and Sn, or an alloy or a composite oxide including these metals may be employed. For the binding agent included in the anode active substance layer, for example, the same resin as that in the case of the cathode plate 12 may be employed. When the anode combined material slurry is prepared with a water-based solvent, styrene-butadiene rubber (SBR), CMC or a salt thereof, a polyacrylic acid or a salt thereof, polyvinyl alcohol, or the like may be used. For these materials, one material may be used as a single entity, or two or more materials may be used in combination.

A core exposed portion in which a surface of a metal forming the anode core is exposed is provided on the anode plate 18. The core exposed portions of the anode plate 18 are portions to which the anode leads 22a and 22b are respectively connected, and in which the surface of the anode core is not covered by the anode active substance layer. The core exposed portions of the anode plate 18 have an approximately quadrangular shape in the front view, elongated along the width direction of the anode plate 18, and are formed in a wider width than the anode leads 22a and 22b.

In the present embodiment, the two anode leads 22a and 22b are joined to a surface of the anode core on an outer circumferential side by, for example, ultrasonic welding, laser welding, or the like. Upper ends of the anode leads 22a and 22b are disposed over the core exposed portions of the anode plate 18, and lower ends extend from lower ends of the core exposed portions in a downward direction.

The core exposed portions of the anode plate 18 are provided, for example, on ends in the long-length direction of the anode plate 18 (that is, a roll-start-side end and a roll-completion-side end), over an entire length in the width direction of the anode core. The anode lead 22a is provided on the core exposed portion on the roll-start-side end of the anode plate 18, and the anode lead 22b is provided on the core exposed portion on the roll-completion-side end of the anode plate 18. In this manner, by providing the anode leads 22a and 22b on both ends in the long-length direction of the anode plate 18, the electricity collecting characteristic can be improved. The disposition method of the anode leads is not limited to this configuration, and alternatively, only the anode lead 22a may be provided at the roll-start-side end of the anode plate 18. In this case, a structure is desirably employed in which the core exposed portion on the roll-completion-side end directly contacts an inner circumferential surface of the exterior housing can 51. The core exposed portions are provided, for example, by intermittent application in which the anode combined material slurry is not applied at a portion of the anode core.

Similar to the case of the cathode plate 12, the first tape (not shown) is adhered to portions of the anode leads 22a and 22b, and, similar to the case of the cathode plate 12, the second tape (not shown) is adhered to a portion of the anode plate 18 to cover the core exposed portions.

For the separator 25, a porous sheet having an ion permeability and an insulating characteristic is used. Specific examples of the porous sheet include a microporous thin film, a woven fabric, a non-woven fabric, and the like. As a material of the separator 25, desirably, an olefin resin is used such as polyethylene, polypropylene, or the like. A thickness of the separator 25 is, for example, 10 μm to 50 μm.

According to the cathode plate 12 and the battery 10 described above, the second active substance layer 15 having a higher electrical conductivity than the first active substance layer 14 is provided at a portion, in the long-length direction Y, of the first surface 13a of the cathode core 13, adjacent to the core exposed portion 12a in which the cathode core 13 is exposed. With this configuration, in the first active substance layer 14 having a lower electrical conductivity than the second active substance layer 15, the current more easily flows from a position far from the cathode lead 17 via a nearby second active substance layer 15 having a lower electrical resistance toward the cathode lead 17. Thus, the internal resistance of the battery 10 can be reduced. In addition, in order to reduce the internal resistance of the battery 10, a configuration in which the second active substance layer having a high electrical conductivity is formed over the entirety of the first surface 13a of the cathode plate 12 other than the core exposed portion is not employed, or a configuration in which a core exposed region having no active substance layer is formed in place of the second active substance layer is not employed. Thus, the battery reaction can efficiently take place at large portions of the cathode plate 12, and the excessive reduction of the battery capacity can be prevented in the battery 10 which uses the cathode plate 12.

Figure 5:
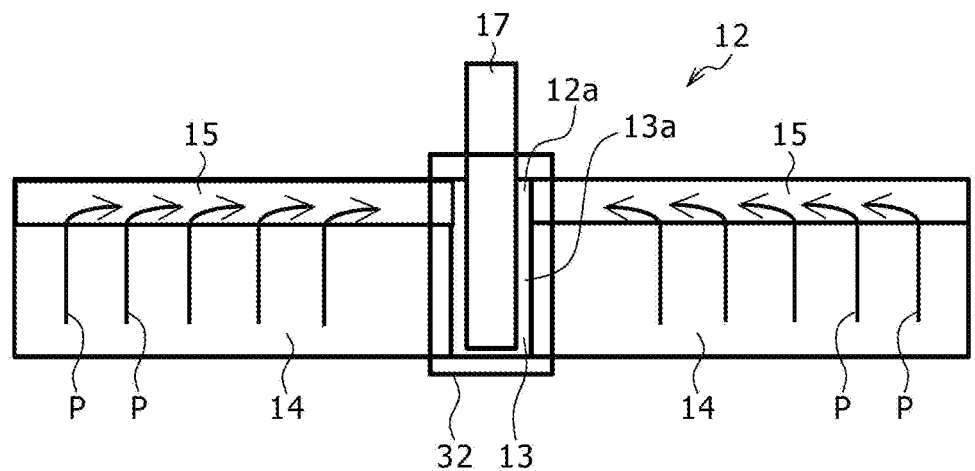
FIG. 5 is a diagram corresponding to FIG. 2, and showing a direction on the cathode plate in which electricity more easily flows, in an example configuration of an embodiment of the present disclosure.

FIG. 5 is a diagram corresponding to FIG. 2, and showing a direction on the cathode plate 12 in which the electricity more easily flows in an example configuration of the present embodiment. In FIG. 5, an arrow P schematically shows a direction in which the electricity more easily flows due to the battery reaction occurring between the cathode plate 12 and the anode plate. On the side of the first surface 13a of the cathode plate 12 (front side of the page of FIG. 5), a current flows from both the first active substance layer 14 and the second active substance layer 15 toward the cathode lead 17 due to the battery reaction. In this configuration, from a position far from the cathode 17 on the first active substance layer 14, the current more easily flows via the nearby second active substance layer 15 having a low electrical resistance toward the cathode lead 17. Thus, the electrical resistance becomes low in a current passing route in a large portion on the side of the first surface 13a of the cathode plate 12, and the internal resistance of the battery 10 can consequently be reduced. In addition, because it is not necessary to increase the number of core exposed portions, the excessive reduction of the battery capacity can be prevented.

Further, as it is not necessary to increase the number of cathode leads in order to reduce the internal resistance of the battery 10, the cost can be reduced, and a number of components can be reduced.

Figure 6:
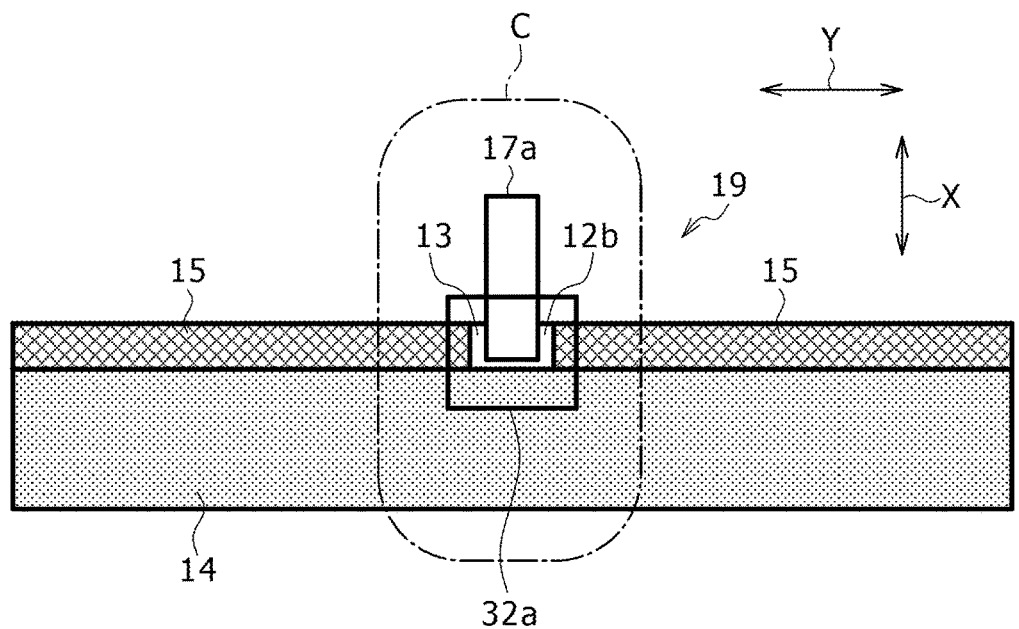
FIG. 6 is a diagram corresponding to FIG. 2, and showing a cathode plate which is an electrode plate for a non-aqueous electrolyte secondary battery of an alternative configuration of an embodiment of the present disclosure.
Figure 7:
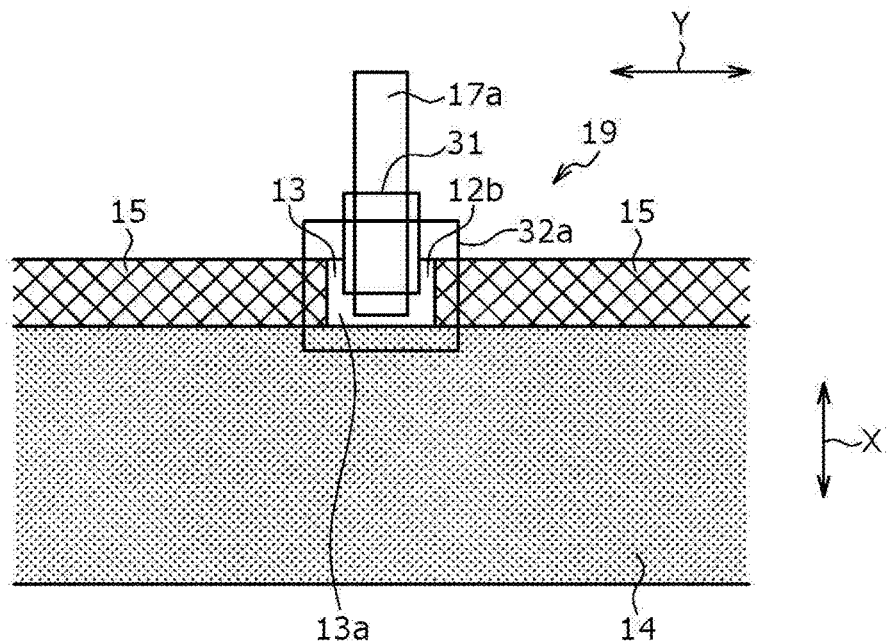
FIG. 7 is an enlarged diagram of a C part of FIG. 6.

FIG. 6 is a diagram corresponding to FIG. 2, and showing a cathode plate 19 which is an electrode plate for a battery in an alternative configuration of the present embodiment. FIG. 7 is an enlarged view of a C part of FIG. 6. In a structure of this configuration, on the first surface 13a of the cathode core 13, the first active substance layer 14 is formed at a portion including an end on an opposite side to the side of extension of a cathode lead 17a in the short-length direction X (lower ends of FIGS. 6 and 7), over an entire length in the long-length direction Y. In addition, a core exposed portion 12b is formed only at a portion in the short-length direction X on the cathode core 13 so as to not reach an end at an opposite side (lower ends of FIGS. 6 and 7) of an end on the side of extension of the cathode lead 17 (upper ends of FIGS. 6 and 7). The cathode lead 17a is connected to the core exposed portion 12b. Because of this, a second tape 32a is adhered to only cover a portion in the short-length direction X of the cathode plate 19, including the connection portion of the cathode lead 17a with the cathode plate 19.

The second active substance layer 15 is formed in the same range as the range of the core exposed portion 12b in the short-length direction X of the cathode core 13. In such a structure, when the second active substance layer 15 is formed over the cathode core 13, the core exposed portion 12b can be formed by executing intermittent application with the application nozzle which ejects the second combined material slurry. In this case, the application nozzle which ejects the first combined material slurry executes continuous application over the entirety of the cathode plate 12 in the long-length direction Y.

According to the structure described above, the area of the first active substance layer 14 on the first surface 13a of the cathode core 13 can be increased in comparison to the structure of FIGS. 1 to 5, and thus, the battery capacity can be increased. The other structures and operations in the present configuration are similar to those of the structure of FIGS. 1 to 5.

Figure 8:
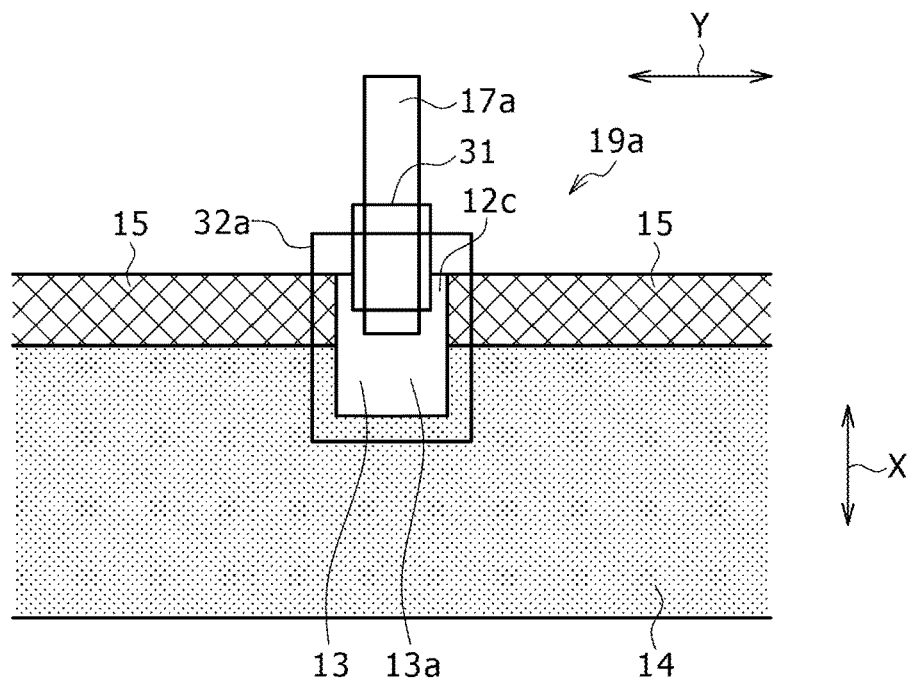
FIG. 8 is a diagram corresponding to FIG. 7, and showing a cathode plate which is an electrode plate for a non-aqueous electrolyte secondary battery of an alternative configuration of an embodiment of the present disclosure.

FIG. 8 is a diagram corresponding to FIG. 7, and showing a cathode plate 19a which is an electrode plate for a battery in an alternative configuration of the present embodiment. In a structure of this configuration, a core exposed portion 12c is enlarged in the short-length direction X in comparison to the structure of FIGS. 6 and 7, and the core exposed portion 12c is also formed at a portion in the short-length direction X in which the first active substance layer 14 is disposed. In such a structure, when the second active substance layer 15 is formed over the cathode core 13, the intermittent application is executed by the application nozzle which ejects the second combined material slurry. In addition, a configuration is employed in which the application nozzle which ejects the first combined material slurry includes a first ejection port which executes continuous ejection and a second ejection port which executes intermittent ejection, and intermittent application is achieved by the second ejection port intermittently ejecting the first combined material slurry. With this configuration, the core exposed portion 12c can be formed. The other structures and other operations in the present configuration are similar to those of the structure of FIGS. 1 to 5 or those of the structure of FIGS. 6 and 7.

Figure 9:
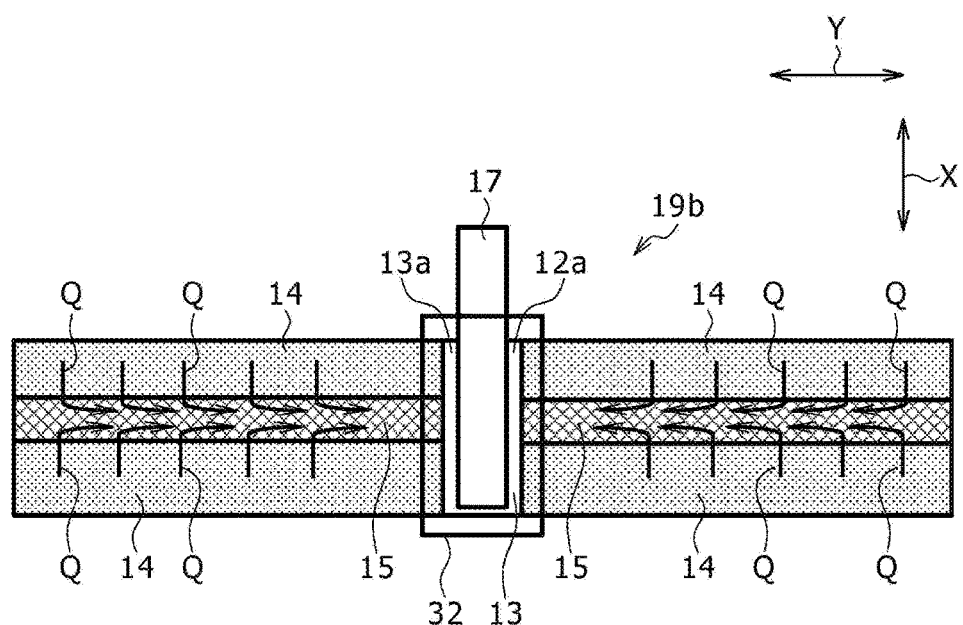
FIG. 9 is a diagram corresponding to FIG. 2, and showing a cathode plate which is an electrode plate for a non-aqueous electrolyte secondary battery of an alternative configuration of an embodiment of the present disclosure.

FIG. 9 is a diagram corresponding to FIG. 2, and showing a cathode plate 19b which is an electrode plate for a battery in an alternative configuration of the present embodiment. In the structure of the present configuration, on the first surface 13a of the cathode core 13, the second active substance layer 15 is formed only in an intermediate portion in the short-length direction X of the cathode core 13, over an entire region in the long-length direction Y other than the core exposed portion 12a. Consequently, the first active substance layer 14 is formed on both sides of the second active substance layer 15 in the short-length direction X on the first surface 13a of the cathode core 13.

According to the above-described configuration, the current more easily flows from the two first active substance layers 14 distanced in the short-length direction X via the second active substance layer 15. An arrow Q in FIG. 9 shows a direction in which the current more easily flows. In this configuration, because the lengths of the first active substance layers 14 in the short-length direction X are shortened, the internal resistance of the battery may be further reduced. The other structures and operations in the present configuration are similar to those of the structure of FIGS. 1 to 5.

Figure 10:
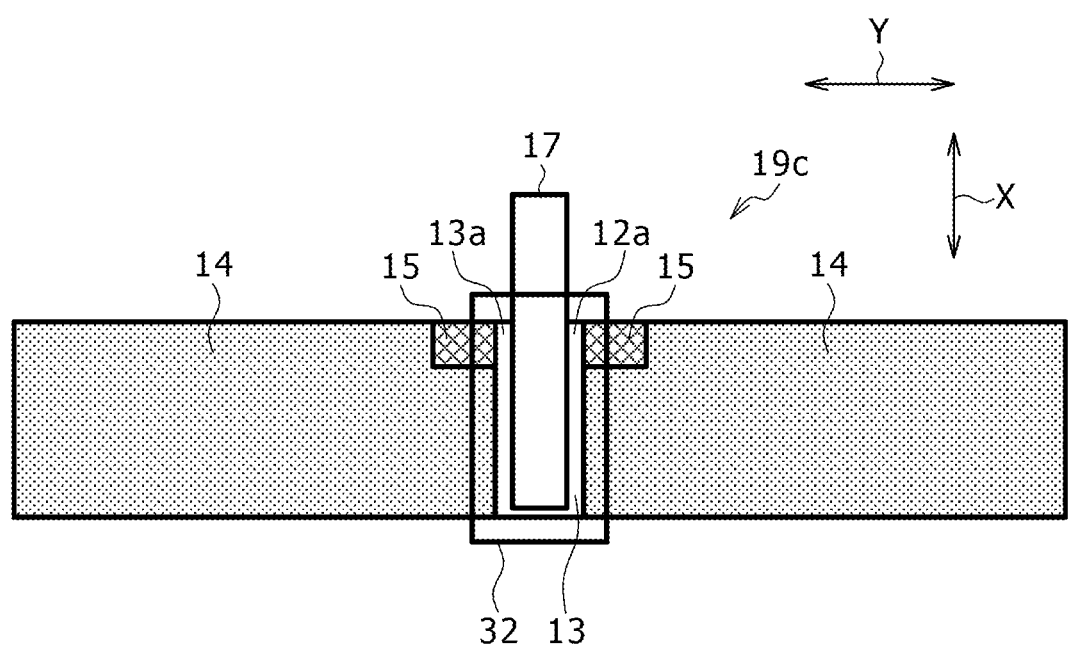
FIG. 10 is a diagram corresponding to FIG. 2, and showing a cathode plate which is an electrode plate for a non-aqueous electrolyte secondary battery of an alternative configuration of an embodiment of the present disclosure.

FIG. 10 is a diagram corresponding to FIG. 2, and showing a cathode plate 19c which is an electrode plate for a battery in an alternative configuration of the present embodiment. In the structure of the present configuration, unlike the structure of FIGS. 1 to 5, on the first surface of the cathode core 13, the second active substance layer 15 is formed only on an end on the side of the core exposed portion 12a in the long-length direction Y on both sides in the long-length direction Y sandwiching the core exposed portion 12a. With this configuration, the second active substance layer 15 does not reach the ends in the long-length direction Y of the cathode plate 19c. Thus, the second active substance layer 15 is formed only at a portion of the region in the long-length direction other than the core exposed portion 12a of the cathode core 13. Consequently, a portion of the first active substance layer 14 is formed at an outer side in the long-length direction Y of the second active substance layer 15 on the cathode core 13. The other structures and operations in the present configuration are similar to those of the structure of FIGS. 1 to 5. The structure of FIG. 10 may also be applied to a structure, such as the structure of FIG. 9, in which, on the first surface 13a of the cathode core 13, the second active substance layer 15 is formed only at the intermediate portion in the short-length direction X of the cathode core 13.

Although not shown in the figures, the second active substance layer 15 is not limited to that formed along the long-length direction Y on the first surface of the cathode core 13, and may alternatively be formed inclined with respect to the long-length direction of the cathode core 13.

Further, in the above, a case is described in which the second active substance layer 15 is formed over the first surface on the side of the cathode lead connection of the cathode plate. Alternatively, the second active substance layer may be formed on the first surface on the side of the anode lead connection of the anode plate, in addition to or in place of the cathode plate. In this case, the second active substance layer formed over the anode plate has a higher electrical conductivity than the first active substance layer formed over the anode plate. With such a configuration also, similar to the case of the cathode plate, the internal resistance of the battery can be reduced without excessively reducing the battery capacity.

Moreover, in the above, a case is exemplified in which the second active substance layer is formed only over the first surface on the side of the cathode lead connection of the cathode plate, but alternatively, a configuration may be employed in which the second active substance layer is formed only over the second surface at a side opposite from the first surface on the side of the cathode lead connection, or a configuration may be employed in which the second active substance layer is formed over both the first surface and the second surface. Further alternatively, in this case, the anode plate or the anode lead may be employed in place of the cathode plate or the cathode lead.

REFERENCE SIGNS LIST

10 BATTERY; 11 ELECTRODE ELEMENT; 12 CATHODE PLATE; 12a, 12b, 12c CORE EXPOSED PORTION; 13 CATHODE CORE; 14 FIRST ACTIVE SUBSTANCE LAYER; 15 SECOND ACTIVE SUBSTANCE LAYER; 17, 17a CATHODE LEAD; 18 ANODE PLATE; 19, 19a, 19b, 19c CATHODE PLATE; 22a, 22b ANODE LEAD; 25 SEPARATOR; 31 FIRST TAPE; 32, 32a SECOND TAPE; 51 EXTERIOR HOUSING CAN; 52 SEALING ELEMENT; 53, 54 INSULATING PLATE; 56 PROTRUDING PORTION; 57 FILTER; 58 LOWER VALVE ELEMENT; 59 INSULATING MEMBER; 60 UPPER VALVE ELEMENT; 61 CAP; 62 GASKET.

The invention claimed is:

1. An electrode plate for a non-aqueous electrolyte secondary battery, comprising:
a core having a band shape;
a first active substance layer formed over at least a first surface of the core, wherein an electricity collecting lead is connected to an exposed portion in which the core is exposed at a portion of the first surface, wherein the exposed portion does not extend across an entire length of the first surface in a long-length direction of the core; and a second active substance layer that is disposed over a portion of the first surface, adjacent to the exposed portion, and that has a higher electrical conductivity than the first active substance layer, wherein the first active substance layer and the second active substance layer are located in different ranges of the first surface in a plan view of the core, and the second active substance layer has a larger amount of an electrically conductive material per unit area than the first active substance layer.

2. The electrode plate for non-aqueous electrolyte secondary battery according to claim 1, wherein
an electrically conductive material contained in the second active substance layer is in a fiber-form, and
an electrically conductive material contained in the first active substance layer is in a non-fiber, particle form.

3. The electrode plate for non-aqueous electrolyte secondary battery according to claim 1, wherein
the second active substance layer is disposed only at a portion that does not extend across an entire length of the first surface in a short-length direction of the core.

4. The electrode plate for non-aqueous electrolyte secondary battery according to claim 3, wherein
the second active substance layer is formed along the long-length direction of the core.

5. The electrode plate for non-aqueous electrolyte secondary battery according to claim 4, wherein
the second active substance layer extends across an entire length of the first surface in the long-length direction, except for the exposed portion of the core in the long-length direction.

6. The electrode plate for non-aqueous electrolyte secondary battery according to claim 1, wherein
the second active substance layer is formed at an end on a side of extension of the electricity collecting lead in a short-length direction of the core.

7. The electrode plate for non-aqueous electrolyte secondary battery according to claim 6, wherein
the first active substance layer is formed at an end on an opposite side to the side of extension of the electricity collecting lead in the short-length direction of the core, over an entire length of the core in the long-length direction, and
the exposed portion is formed over the core in a manner to not reach an end on a side opposite to an end on the side of extension of the electricity collecting lead.

8. A non-aqueous electrolyte secondary battery comprising:
an electrode element in which at least one cathode plate and at least one anode plate are rolled with a separator therebetween; and
an exterior housing can that houses the electrode element, wherein
at least one of the cathode plate or the anode plate is the electrode plate for a non-aqueous electrolyte secondary battery according to claim 1.

9. An electrode plate for a non-aqueous electrolyte secondary battery, comprising:
a core having a band shape;
a first active substance layer formed over at least a first surface of the core, wherein an electricity collecting lead is connected to an exposed portion in which the core is exposed at a portion of the first surface, wherein the exposed portion does not extend across an entire length of the first surface in a long-length direction of the core; and a second active substance layer that is disposed over a portion of the first surface, adjacent to the exposed portion, and that has a higher electrical conductivity than the first active substance layer, wherein the first active substance layer and the second active substance layer are located in different ranges of the first surface in a plan view of the core, and the second active substance layer is formed only over an intermediate portion of the core in a short-length direction.

10. An electrode plate for a non-aqueous electrolyte secondary battery, comprising:
a core having a band shape;
a first active substance layer formed over at least a first surface of the core, wherein an electricity collecting lead is connected to an exposed portion in which the core is exposed at a portion of the first surface in a long-length direction; and
a second active substance layer that is disposed over a portion of the first surface, adjacent to the exposed portion, and that has a higher electrical conductivity than the first active substance layer,
wherein the second active substance layer is formed only over an intermediate portion of the core in a short-length direction.

11. The electrode plate for non-aqueous electrolyte secondary battery according to claim 10, wherein
the second active substance layer has a larger amount of an electrically conductive material per unit area than the first active substance layer.

12. The electrode plate for non-aqueous electrolyte secondary battery according to claim 10, wherein
an electrically conductive material contained in the second active substance layer is in a fiber-form, and
an electrically conductive material contained in the first active substance layer is in a non-fiber, particle form.

13. The electrode plate for non-aqueous electrolyte secondary battery according to claim 10, wherein
the second active substance layer is disposed only at a portion that does not extend across an entire length of the first surface in a short-length direction of the core.

14. The electrode plate for non-aqueous electrolyte secondary battery according to claim 13, wherein
the second active substance layer is formed along a long-length direction of the core.

15. The electrode plate for non-aqueous electrolyte secondary battery according to claim 14, wherein
the second active substance layer extends across an entire length of the first surface in the long-length direction, except for the exposed portion of the core in the long-length direction.

16. The electrode plate for non-aqueous electrolyte secondary battery according to claim 10, wherein
the second active substance layer is formed at an end on a side of extension of the electricity collecting lead in the short-length direction of the core.

17. The electrode plate for non-aqueous electrolyte secondary battery according to claim 16, wherein
the first active substance layer is formed at an end on an opposite side to the side of extension of the electricity collecting lead in the short-length direction of the core, over an entire length of the core in the long-length direction, and the exposed portion is formed over the core in a manner to not reach an end on a side opposite to an end on the side of extension of the electricity collecting lead.

18. A non-aqueous electrolyte secondary battery comprising:
an electrode element in which at least one cathode plate and at least one anode plate are rolled with a separator therebetween; and
an exterior housing can that houses the electrode element, wherein
at least one of the cathode plate or the anode plate is the electrode plate for a non-aqueous electrolyte secondary battery according to claim 11.

19. An electrode plate for a non-aqueous electrolyte secondary battery, comprising:
a core having a band shape;
a first active substance layer formed over at least a first surface of the core, wherein an electricity collecting lead is connected to an exposed portion in which the core is exposed at a portion of the first surface, wherein the exposed portion does not extend across an entire length of the first surface in a long-length direction of the core; and
a second active substance layer that is disposed over a portion of the first surface, adjacent to the exposed portion, and that has a higher electrical conductivity than the first active substance layer,
wherein the first active substance layer and the second active substance layer are located in different ranges of the first surface in a plan view of the core,
the second active substance layer includes a fiber-form electrically conductive material, and
the first active substance layer includes a non-fiber, particle form electrically conductive material and is free of the fiber-form electrically conductive material.

* * * * *